(12) United States Patent
Fukushima

(10) Patent No.: US 9,118,821 B2
(45) Date of Patent: Aug. 25, 2015

(54) MEMORY CARD WITH WIRELESS COMMUNICATION FUNCTION, METHOD OF OPERATING MEMORY CARD WITH WIRELESS COMMUNICATION FUNCTION, AND NON-TRANSITORY COMPUTER-READABLE DEVICE STORING A PROGRAM FOR OPERATING MEMORY CARD WITH WIRELESS COMMUNICATION FUNCTION

(71) Applicant: OLYMPUS CORPORATION, Tokyo (JP)

(72) Inventor: Keito Fukushima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 222 days.

(21) Appl. No.: 13/668,863

(22) Filed: Nov. 5, 2012

(65) Prior Publication Data
US 2013/0113944 A1    May 9, 2013

(30) Foreign Application Priority Data
Nov. 7, 2011   (JP) .................. 2011-243864

(51) Int. Cl.
*H04N 5/76*  (2006.01)
*H04N 5/225* (2006.01)
*H04N 5/232* (2006.01)

(52) U.S. Cl.
CPC ............... *H04N 5/225* (2013.01); *H04N 5/232* (2013.01); *H04N 5/23206* (2013.01)

(58) Field of Classification Search
CPC ............ H04N 1/2112; H04N 2101/00; H04N 1/2158; H04N 5/772; H04N 5/907; H04N 2201/0087
USPC ........................................... 348/231.99–231.9
See application file for complete search history.

(56) References Cited

U.S. PATENT DOCUMENTS

| 7,702,821 B2 * | 4/2010 | Feinberg et al. ................. 710/13 |
| 2003/0128272 A1 * | 7/2003 | Clough et al. ............. 348/14.02 |
| 2012/0166577 A1 * | 6/2012 | Yoneyama et al. ........... 709/217 |

FOREIGN PATENT DOCUMENTS

| JP | 2006-031512 A | 2/2006 |
| JP | 2010-67060 A | 3/2010 |

(Continued)

OTHER PUBLICATIONS

"Eye-Fi Memory Cards: Wireless Photo and Video Uploads straight from Your Camera to Your Computer," online, searched on Oct. 17, 2011, Internet URL: http://eyefi.co.jp/, (1 pages).
"Photography—Electronic still picture imaging—Picture transfer protocol (PTP) for digital still photography devices", PTP: ISO 15740, dated 2008, (14 pages).
"CIPA DC-X005-2005", Camera & Imaging Products Association, dated Jul. 28, 2005, (32 pages).

(Continued)

*Primary Examiner* — Tuan Ho
*Assistant Examiner* — Selam Gebriel
(74) *Attorney, Agent, or Firm* — Westerman, Hattori, Daniels & Adrian, LLP

(57) ABSTRACT

A memory card with a wireless communication function may include a card interface (I/F) unit, a storage unit configured to store processing content information when the processing content information indicating processing content has been input from the host equipment to the card I/F unit; a wireless communication unit; a processing determination unit configured to determine whether or not the storage unit has stored the processing content information corresponding to processing request information when the wireless communication unit has received the processing request information transmitted from the external apparatus, a processing execution unit, and a processing relay unit configured to output the processing request information to the host equipment via the card I/F unit when the processing determination unit determines that the storage unit has stored the processing content information corresponding to the processing request information.

3 Claims, 12 Drawing Sheets

(56) References Cited

FOREIGN PATENT DOCUMENTS

| | | |
|---|---|---|
| JP | 2011-087202 A | 4/2011 |
| WO | 2011/108989 A1 | 9/2011 |

OTHER PUBLICATIONS

Office Action dated Oct. 7, 2014, issued in corresponding Japanese Patent Application No. 2011-243864, with English Translation (6 pages).

* cited by examiner

MEMORY CARD WITH WIRELESS COMMUNICATION FUNCTION, METHOD OF OPERATING MEMORY CARD WITH WIRELESS COMMUNICATION FUNCTION, AND NON-TRANSITORY COMPUTER-READABLE DEVICE STORING A PROGRAM FOR OPERATING MEMORY CARD WITH WIRELESS COMMUNICATION FUNCTION

BACKGROUND OF THE INVENTION

1. Field of the Invention

The present invention relates to a memory card with a wireless communication function, a method of operating the memory card with the wireless communication function, a non-transitory computer-readable device, a digital camera, and a method of operating the digital camera.

Priority is claimed on Japanese Patent Application No. 2011-243864, filed Nov. 7, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the related art, wired communication of a universal serial bus (USB) or the like has been mainstream for communication with external apparatuses such as a digital camera and a personal computer (PC). However, in recent years, digital cameras with wireless communication functions have also been marketed, and wireless communication has also been used for communication with external apparatuses.

On the other hand, a memory card with a wireless communication function has the wireless communication function within the memory card as disclosed in "Eye-Fi memory cards: wireless photo and video uploads straight from your camera to your computer," online, searched on Oct. 17, 2011, Internet URL: http://eyefi.cojp/ (hereinafter referred to as Non-Patent Document 1) or Japanese Unexamined Patent Application, First Publication No. 2010-067060 (hereinafter referred to as Patent Document 1). Using this, it is possible to transmit data to an external apparatus using wireless communication even in a digital camera without a wireless communication function. The memory card with the wireless communication function as described above is recognized as a general memory card in the digital camera and image data is read and written. On the other hand, if wireless communication based on a predetermined setting is established, the memory card with the wireless communication function transmits image data or the like recorded in the memory card with the wireless communication function to an external apparatus such as a PC. In this case, the digital camera does not need to perform control related to wireless communication.

The memory card with the wireless communication function as disclosed in Patent Document 1 or Non-Patent Document 1 does not need to control wireless communication by the digital camera, which is host equipment, and reduces cost for software or hardware of the digital camera or a load in implementation.

SUMMARY

The present invention provides a memory card with a wireless communication function, a method of operating the memory card with the wireless communication function, a non-transitory computer-readable device, a digital camera, and a method of operating the digital camera, which can execute processing based on processing request information transmitted from an external apparatus even in host equipment without the wireless communication function.

A memory card with a wireless communication function may include: a card interface (I/F) unit configured to input and output data to and from host equipment; a storage unit configured to store processing content information when the processing content information indicating processing content has been input from the host equipment to the card I/F unit; a wireless communication unit configured to transmit and receive data by using wireless communication with an external apparatus; a processing determination unit configured to determine whether or not the storage unit has stored the processing content information corresponding to processing request information when the wireless communication unit has received the processing request information transmitted from the external apparatus; a processing execution unit configured to execute processing for the processing request information when the processing determination unit determines that the storage unit has not stored the processing content information corresponding to the processing request information, and transmit execution result information indicating an execution result to the external apparatus via the wireless communication unit; and a processing relay unit configured to output the processing request information to the host equipment via the card I/F unit when the processing determination unit determines that the storage unit has stored the processing content information corresponding to the processing request information, and transmit the execution result information to the external apparatus via the wireless communication unit when the execution result information indicating the execution result obtained by executing the processing for the processing request information has been input from the host equipment to the card I/F unit.

The processing content information may indicate content of the processing to be executed by the host equipment.

A method of operating a memory card with a wireless communication function may include: an input/output (IO) step of inputting and outputting data to and from host equipment; a storage step of storing processing content information when the processing content information indicating processing content has been input from the host equipment in the I/O step; a wireless communication step of transmitting and receiving data using wireless communication with an external apparatus; a processing determination step of determining whether or not the processing content information corresponding to processing request information has been stored in the storage step when the processing request information transmitted from the external apparatus has been received in the wireless communication step; a processing execution step of executing processing for the processing request information when it is determined in the processing determination step that the processing content information corresponding to the processing request information has not been stored in the storage step, and transmitting execution result information indicating an execution result to the external apparatus via a wireless communication unit; and a processing relay step of outputting the processing request information to the host equipment via the card I/F unit when it is determined, in the processing determination step, that the processing content information corresponding to the processing request information has been stored in the storage step, and transmitting the execution result information to the external apparatus when the execution result information indicating the execution result obtained by executing the processing for the processing request information has been input from the host equipment.

A non-transitory computer-readable device may include a computer program for causing a computer to execute: an IO step of inputting and outputting data to and from host equipment; a storage step of storing processing content information when the processing content information indicating processing content has been input from the host equipment in the IO step; a wireless communication step of transmitting and receiving data using wireless communication with an external apparatus; a processing determination step of determining whether or not the processing content information corresponding to processing request information has been stored in the storage step when the processing request information transmitted from the external apparatus has been received in the wireless communication step; a processing execution step of executing processing for the processing request information when it is determined, in the processing determination step, that the processing content information corresponding to the processing request information has not been stored in the storage step, and transmitting execution result information indicating an execution result to the external apparatus via a wireless communication unit; and a processing relay step of outputting the processing request information to the host equipment via the card I/F unit when it is determined in the processing determination step that the processing content information corresponding to the processing request information has been stored in the storage step, and transmitting the execution result information to the external apparatus when the execution result information indicating the execution result obtained by executing the processing for the processing request information has been input from the host equipment.

A digital camera may include: a card I/F unit configured to input and output data to and from a memory card with a wireless communication function; a processing content notification unit configured to output processing content information indicating processing content to the memory card with the wireless communication function via the card I/F unit; and a processing execution unit configured to execute processing for processing request information when the processing request information indicating a processing request has been input to the card I/F unit and output execution result information indicating an execution result to the memory card with the wireless communication function via the card I/F unit.

A method of operating a digital camera may include: an IO step of inputting and outputting data to and from a memory card with a wireless communication function; a processing content notification step of outputting processing content information indicating processing content to the memory card with the wireless communication function in the IO step; and a processing execution step of executing processing for processing request information when the processing request information indicating a processing request has been input in the IO step and outputting execution result information indicating an execution result to the memory card with the wireless communication function.

According to a memory card with a wireless communication function in accordance with a preferred embodiment of the present invention, a card interface (I/F) unit inputs and outputs data to and from host equipment. In addition, a storage unit stores processing content information when the processing content information indicating processing content has been input from the host equipment to the card I/F unit. In addition, a wireless communication unit transmits and receives data using wireless communication with an external apparatus. In addition, a processing determination unit determines whether or not the storage unit has stored the processing content information corresponding to processing request information when the wireless communication unit has received the processing request information transmitted from the external apparatus. In addition, a processing execution unit executes processing for the processing request information when the processing determination unit determines that the storage unit has not stored the processing content information corresponding to the processing request information, and transmits execution result information indicating an execution result to the external apparatus via the wireless communication unit. In addition, a processing relay unit outputs the processing request information to the host equipment via the card I/F unit when the processing determination unit determines that the storage unit has stored the processing content information corresponding to the processing request information, and transmits the execution result information to the external apparatus via the wireless communication unit when the execution result information indicating the execution result obtained by executing the processing for the processing request information has been input from the host equipment to the card I/F unit.

According to this configuration, the memory card with the wireless communication function outputs the processing request information to the host equipment when the processing request information corresponding to the processing content information input from the host equipment has been received from the external apparatus, and transmits the execution result to the external apparatus via the wireless communication unit when execution result information indicating the execution result obtained by executing the processing for the processing request information from the host equipment has been input to the card I/F unit. Accordingly, it is possible to execute processing based on the processing request information transmitted from the external apparatus even in the host equipment without the wireless communication function.

In addition, according to the digital camera in accordance with a preferred embodiment of the present invention, a card I/F unit inputs and outputs data to and from a memory card with a wireless communication function. A processing content notification unit outputs processing content information indicating processing content to the memory card with the wireless communication function via the card I/F unit. In addition, a processing execution unit executes processing for processing request information when the processing request information indicating a processing request has been input to the card I/F unit, and outputs execution result information indicating an execution result to the memory card with the wireless communication function via the card I/F unit.

According to this configuration, the digital camera, which is the host equipment, outputs the processing content information to the memory card with the wireless communication function, executes the processing for the processing request information when the processing request information has been input, and outputs the execution result information indicating the execution result to the memory card with the wireless communication function. Accordingly, it is possible to execute processing based on the processing request information transmitted from the external apparatus even in the host equipment without the wireless communication function.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
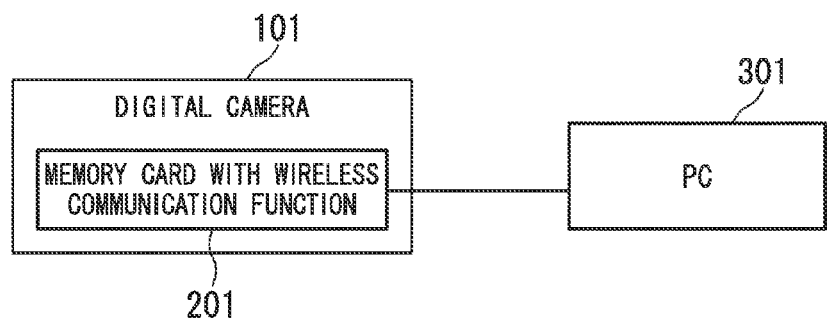
FIG. 1 is a schematic diagram illustrating an example of a connection of a digital camera, a memory card with a wireless communication function, and a PC in accordance with a first preferred embodiment of the present invention.

FIG. 1 is a schematic diagram illustrating an example of a connection of a digital camera, a memory card with a wireless communication function, and a PC in accordance with a first preferred embodiment of the present invention. In the example of FIG. 1, the memory card 201 with the wireless communication function is inserted into the digital camera 101, which is host equipment. The digital camera 101 and the memory card 201 with the wireless communication function can input and output data to and from each other. In addition, the memory card 201 with the wireless communication function and the PC 301, which is an external apparatus, can be connected through wireless communication, and transmit and receive data to and from each other.

The digital camera 101 captures an image and generates captured image data. In addition, the digital camera 101 outputs the generated captured image data to the memory card 201 with the wireless communication function, and causes the memory card 201 with the wireless communication function to store the generated captured image data. The memory card 201 with the wireless communication function stores the captured image data input from the digital camera 101. In addition, the memory card 201 with the wireless communication function transmits the captured image data to the PC 301. The PC 301 receives and stores the captured image data transmitted from the memory card 201 with the wireless communication function.

In addition, the PC 301 transmits processing request information indicating processing to be performed by the digital camera 101 or the memory card 201 with the wireless communication function to the memory card 201 with the wireless communication function. When it is determined that the memory card 201 with the wireless communication function executes the processing indicated by the received processing request information, the memory card 201 with the wireless communication function executes the processing indicated by the processing request information and transmits the execution result to the PC 301. In addition, when it is determined that the digital camera 101 executes the processing indicated by the received processing request information, the memory card 201 with the wireless communication function outputs the processing request information to the digital camera 101. When the processing request information has been input from the memory card 201 with the wireless communication function, the digital camera 101 executes the processing indicated by the input processing request information, and outputs the execution result to the memory card 201 with the wireless communication function. When the execution result has been input from the digital camera 101, the memory card 201 with the wireless communication function transmits the input execution result to the PC 301.

Figure 2:
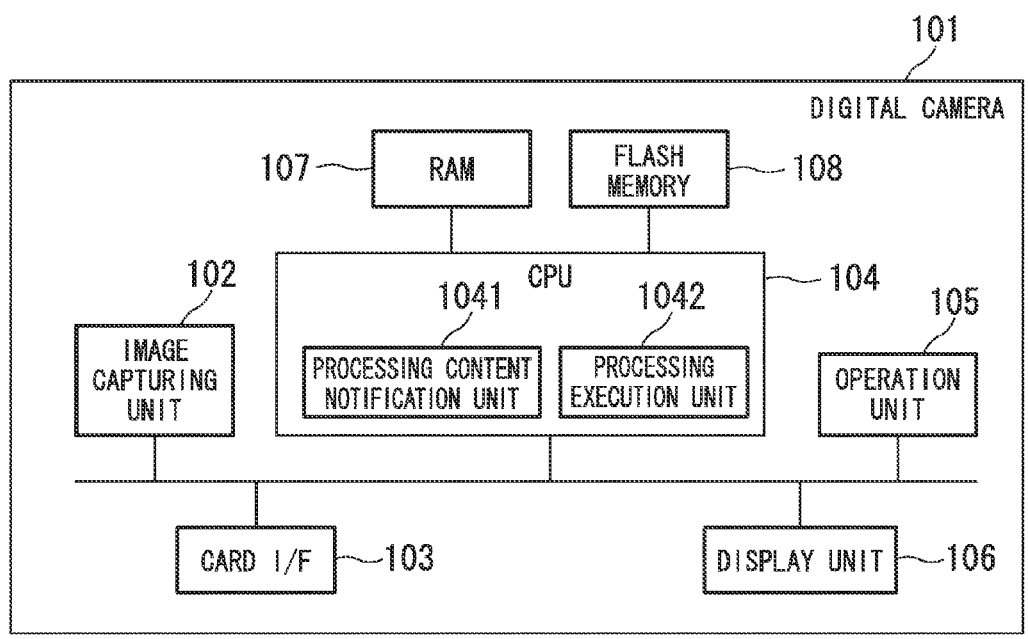
FIG. 2 is a block diagram illustrating a configuration of the digital camera in accordance with the first preferred embodiment of the present invention.

Next, a configuration of the digital camera 101 will be described. FIG. 2 is a block diagram illustrating the configuration of the digital camera 101 in accordance with the first preferred embodiment of the present invention. The digital camera 101 includes an image capturing unit 102, a card I/F 103 (a card interface unit), a central processing unit (CPU)

104, an operation unit 105, a display unit 106, a random access memory (RAM) 107, and a flash memory 108.

The image capturing unit 102 generates an image capturing signal by image capturing a subject, performs various image processing operations on the generated image capturing signal, and creates captured image data. The image data created by the image capturing unit 102 is recorded in the memory card connected to the card I/F 103. The card I/F 103 operates as a host controller of the memory card attachable to and detachable from the digital camera 101, and has a memory I/F for performing writing/reading to/from a storage unit provided in the memory card and an input/output (IO) I/F such as a secure digital IO (SDIO) card. In the first preferred embodiment, an SD memory card and the memory card 201 with the wireless communication function based on SDIO are used as the memory card.

The CPU 104 reads and executes a control program stored in the flash memory 108, and generally controls operations of parts of the digital camera 101 by reading and writing data necessary to execute the program from and to the RAM 107. In addition, the CPU 104 operates as a processing content notification unit 1041 that inputs processing content information indicating content of processing to be executed by the digital camera 101 to the memory card 201 with the wireless communication function. In addition, the CPU 104 operates as a processing execution unit 1042 that executes processing based on processing request information input to the card I/F 103.

The RAM 107 is a readable/writable storage apparatus. The flash memory 108 is a nonvolatile semiconductor memory from which data is not deleted even when a power supply is turned off, and stores a control program, an image capturing parameter, and the like. The operation unit 105 includes an operation switch and the like, and receives an instruction related to an operation of the digital camera 101. The display unit 106 is a liquid crystal display or the like, and displays an image based on captured image data read from the storage unit of the memory card connected to the card I/F 103, a user I/F screen, and the like.

Figure 3:
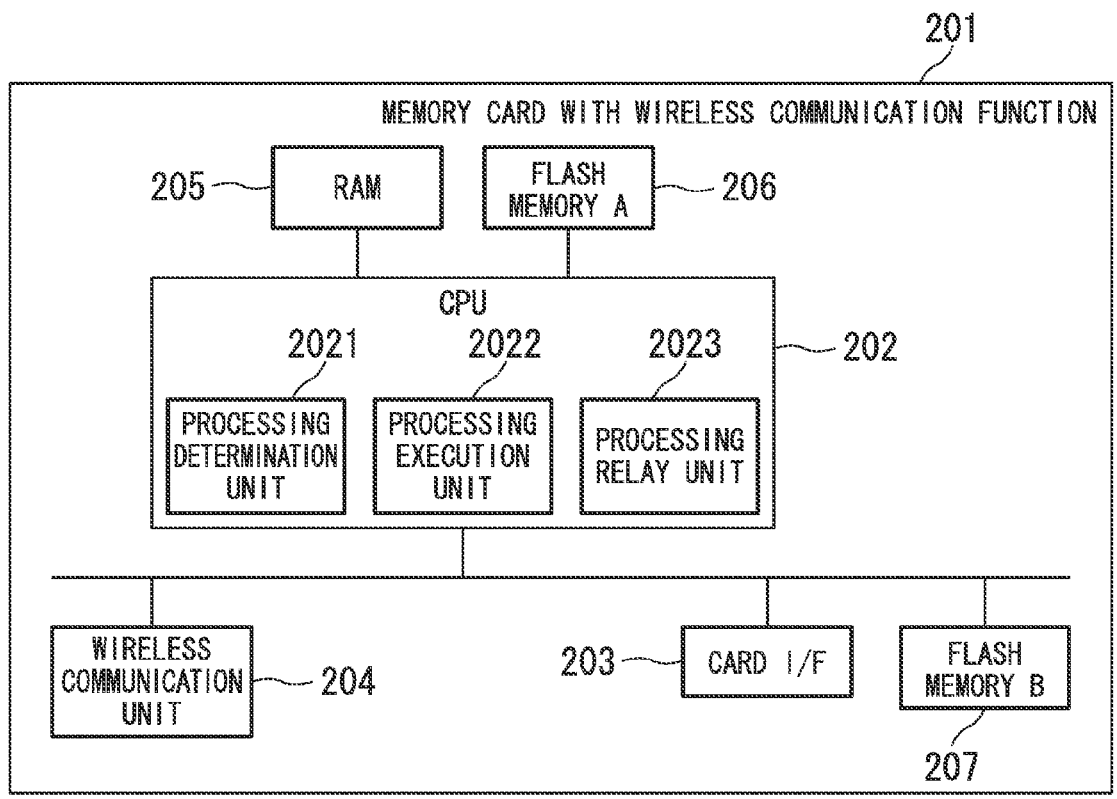
FIG. 3 is a block diagram illustrating a configuration of the memory card with the wireless communication function in accordance with the first preferred embodiment of the present invention.

Next, a configuration of the memory card 201 with the wireless communication function will be described. FIG. 3 is a block diagram illustrating the configuration of the memory card 201 with the wireless communication function in accordance with the first preferred embodiment of the present invention. The memory card 201 with the wireless communication function includes a CPU 202, a card I/F 203 (a card I/F unit), a wireless communication unit 204, a RAM 205 (a storage unit), a flash memory A (206) (a storage unit), and a flash memory B (207) (a storage unit).

The CPU 202 generally controls operations of parts of the memory card 201 with the wireless communication function by reading and executing a control program recorded in flash memory A (206) and reading and writing data necessary to execute the program from and to the RAM 205. In addition, the CPU 202 operates as a processing determination unit 2021 that determines whether processing based on the processing request information transmitted from the PC 301 is executed by the digital camera 101 or the memory card 201 with the wireless communication function. In addition, the CPU 202 operates as a processing execution unit 2022 that executes processing based on the processing request information when the processing determination unit determines that the processing based on the processing request information is executed by the memory card 201 with the wireless communication function. In addition, the CPU 202 operates as a processing relay unit 2023 that inputs the processing request information to the digital camera 101 and transmits the processing result input from the digital camera 101 to the PC 301 when the processing determination unit determines that the processing based on the processing request information is executed by the digital camera 101.

The RAM 205 is a readable/writable storage apparatus. Flash memory A (206) is a nonvolatile semiconductor memory from which data is not deleted even when a power supply is turned off, and stores a control program, a wireless communication parameter, and the like. The card I/F 203 operates as a device controller of the memory card 201 with the wireless communication function, and has a memory I/F for reading and writing from and to flash memory B (207) and an IO I/F such as an SDIO card.

Flash memory B (207) stores data. Specifically, flash memory B (207) reads/writes data in response to a data write/read request input via a memory I/F provided in the card I/F 203. The wireless communication unit 204 is a wireless communication I/F that performs transmission/reception of various data to/from external equipment such as the PC 301 based on control of the CPU 202. The wireless communication unit 204 performs communication using a wireless LAN (WLAN), Bluetooth (registered trademark), IrDA (registered trademark), Transfer JET (registered trademark), WiMedia (registered trademark), or the like.

Figure 4:
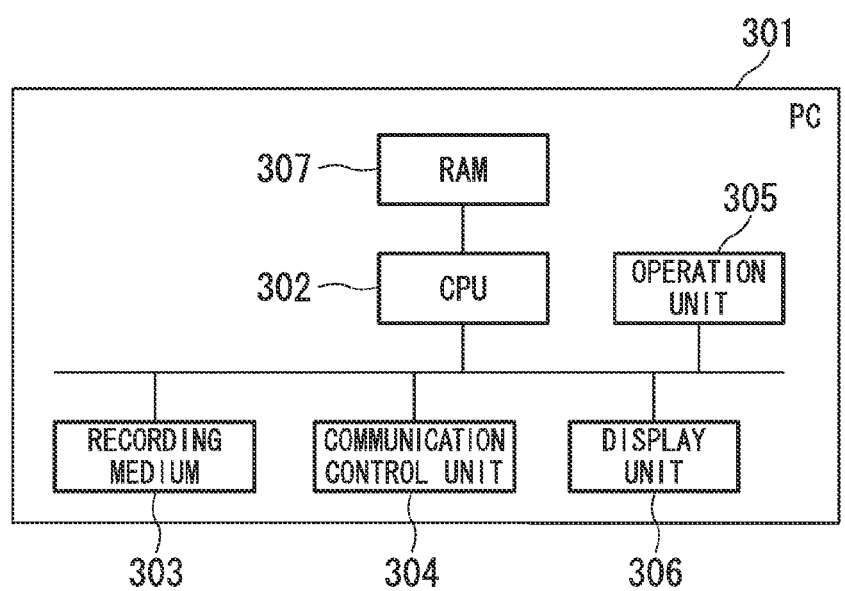
FIG. 4 is a block diagram illustrating a configuration of the PC in accordance with the first preferred embodiment of the present invention.

Next, a configuration of the PC 301 will be described. FIG. 4 is a block diagram illustrating the configuration of the PC 301 in accordance with the first preferred embodiment of the present invention. The PC 301 includes a CPU 302, a recording medium 303, a communication control unit 304, an operation unit 305, a display unit 306, and a RAM 307.

The CPU 302 generally controls operations of parts of the PC 301 by reading and executing a control program recorded in the recording medium 303 and reading and writing data necessary to execute the program from and to the RAM 307. The recording medium 303 is a hard disk, a flash memory, or the like, and records the control program or various data such as document data or image data. The operation unit 305 includes a keyboard, a mouse, and the like, and receives an instruction related to an operation of the PC 301.

The display unit 306 is a liquid crystal display or the like, and performs display based on a user I/F screen or document data, image data, or the like read from the recording medium 303. The communication control unit 304 is a communication I/F that performs transmission/reception of various data to/from equipment such as the digital camera 101 or a printer based on control of the CPU 302. The communication control unit 304 performs wired communication or communication using a WLAN, Bluetooth (registered trademark), IrDA (registered trademark), Transfer JET (registered trademark), WiMedia (registered trademark), or the like.

Figure 5:
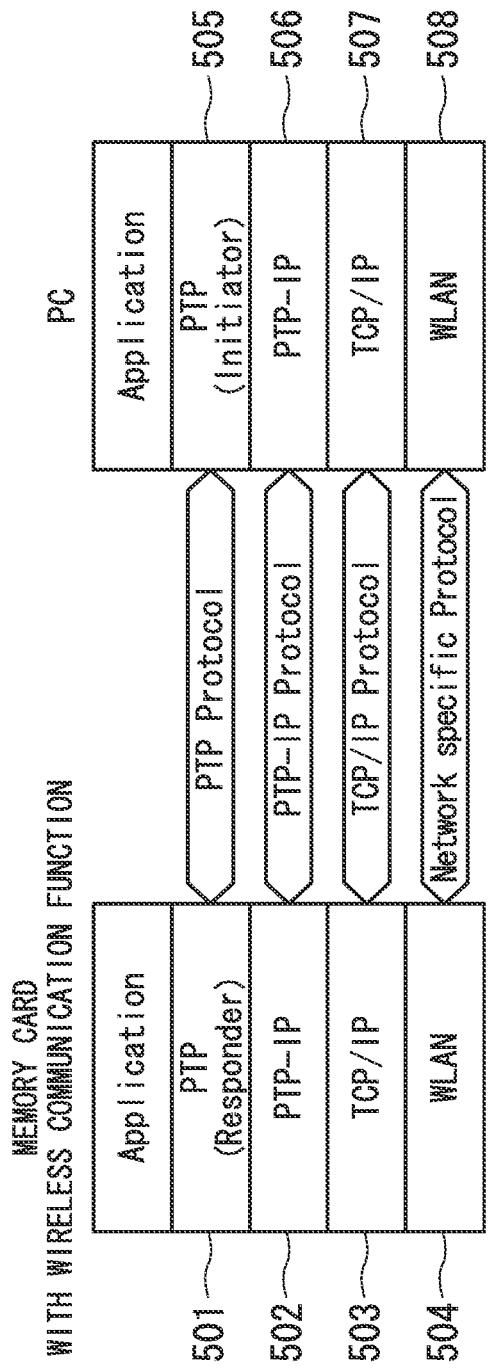
FIG. 5 is a hierarchical diagram of a protocol for use in the IO of data between the memory card with the wireless communication function and the PC in accordance with the first preferred embodiment of the present invention.

Next, a protocol for use in an IO of data between the memory card 201 with the wireless communication function and the PC 301 will be described. FIG. 5 is a hierarchical diagram of the protocol for use in the IO of data between the memory card 201 with the wireless communication function and the PC 301 in accordance with the first preferred embodiment of the present invention.

In the example of FIG. 5, protocol layers to be used by the wireless communication unit 204 of the memory card 201 with the wireless communication function are a picture transfer protocol (PTP: ISO 15740) layer 501, a picture transfer protocol over transmission control protocol/Internet protocol (TCP/IP) networks (PTP-IP: Camera & Image capturing Products Association (CIPA) DC-005) layer 502, a TCP/IP layer 503, and a WLAN layer 504 in order from the higher-order layer. In addition, protocol layers to be used by the communication control unit 304 of the PC 301 are a PTP layer 505, a PTP-IP layer 506, a TCP/IP layer 507, and a WLAN layer 508 in order from the higher-order layer.

As described above, in transmission/reception of data between the memory card 201 with the wireless communication function and the PC 301, PTP, which is a picture transfer protocol, is used. In its lower order, PTP-IP is used to transmit PTP data as a TCP/IP packet. In its lower order, TCP/IP is used to transmit a TCP/IP packet. In a physical communication I/F, a WLAN is used. In addition, if communication between the memory card 201 with the wireless communication function and the PC 301 is established, the memory card 201 with the wireless communication function operates as a PTP responder, and the PC 301 operates as a PTP initiator.

Figure 6:
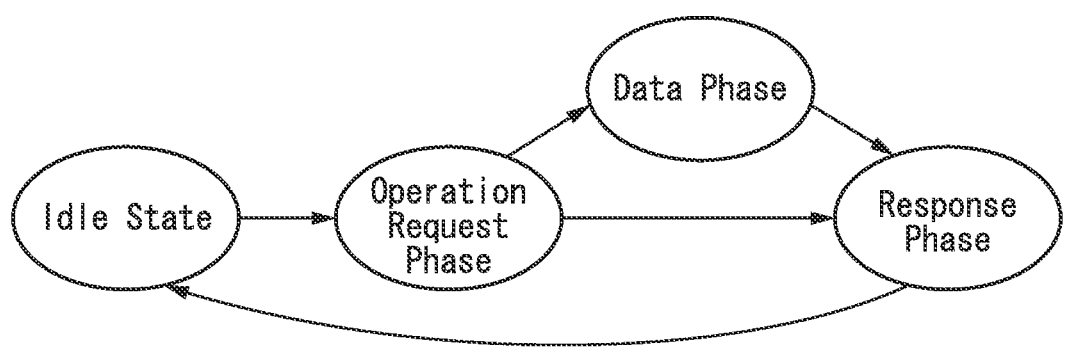
FIG. 6 is a state transition diagram of PTP in accordance with the first preferred embodiment of the present invention.

Next, the state transition of PTP will be described. FIG. 6 is a state transition diagram of PTP in accordance with the first preferred embodiment of the present invention. An operation request is issued from a PTP initiator, and a PTP responder executes the operation request. As illustrated, an operation is executed by taking state transitions of an idle state and transaction states of an operation request phase, a data phase, and a response phase.

The idle state is a state in which the operation is not executed and the PTP responder waits for the operation request to be received. The operation request phase is a phase in which the operation request is transmitted. The data phase is a phase in which data defined for every operation is transmitted and received. The data phase may be absent because data transmission is not included according to the operation. The response phase is a phase in which a response of the operation result is made. In addition, it is possible to transmit an event asynchronous with the above-described state transition. The event is transmitted from the PTP responder to the PTP initiator or from the PTP initiator to the PTP responder.

Figure 7:
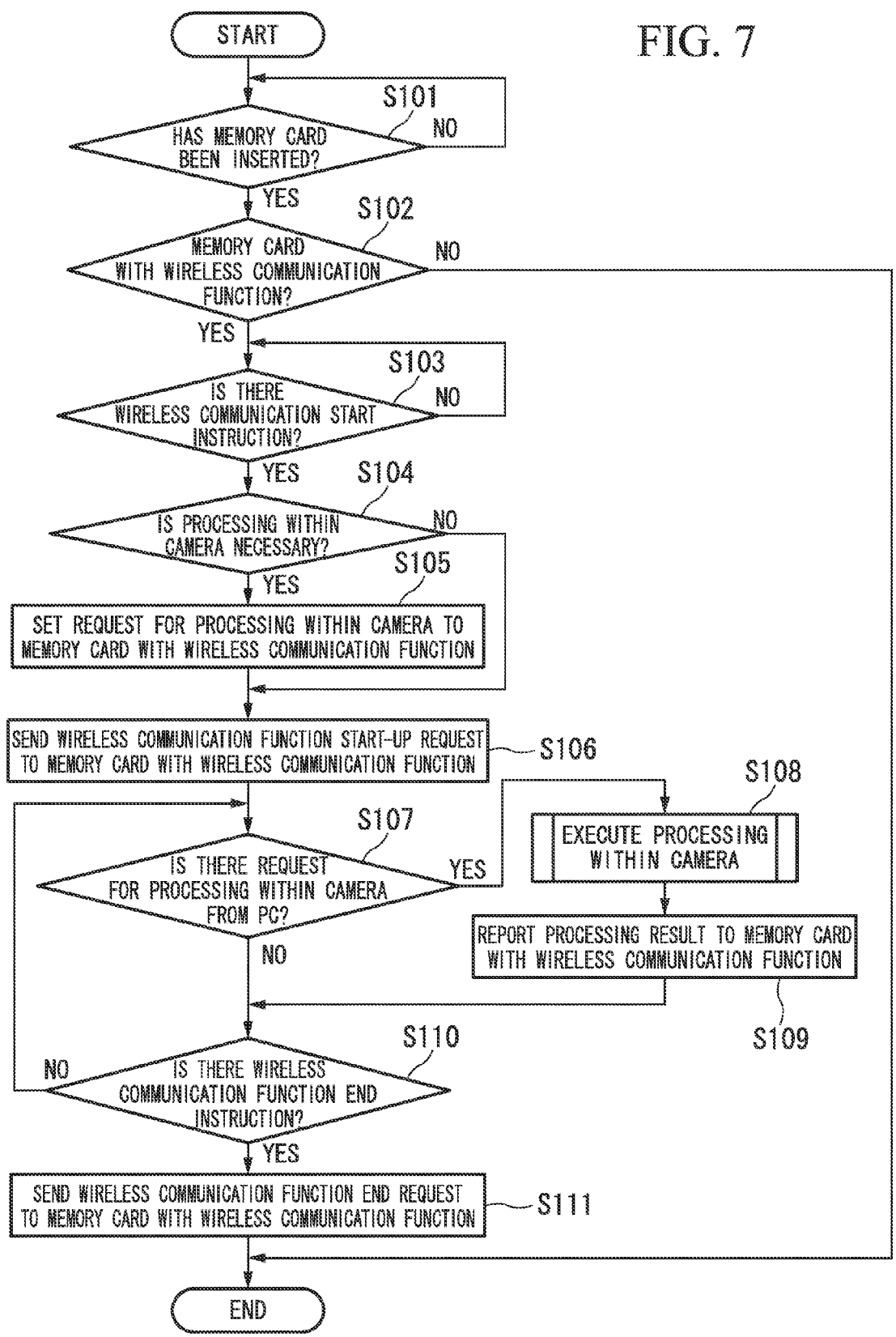
FIG. 7 is a flowchart illustrating an operation procedure of the digital camera in accordance with the first preferred embodiment of the present invention.

Next, an operation procedure of the digital camera 101 will be described. FIG. 7 is a flowchart illustrating the operation procedure of the digital camera 100 in accordance with the first preferred embodiment of the present invention.
(Step S101)
The CPU 104 determines whether or not the memory card has been inserted into the digital camera 101 and connected to the card I/F 103. When the CPU 104 determines that the memory card is inserted and connected to the card I/F 103, the process proceeds to the process of step S102. Otherwise, the process of step S101 is executed again.
(Step S102)
The CPU 104 determines whether or not the memory card connected to the card I/F 103 is the memory card 201 with the wireless communication function. When the CPU 104 determines that the memory card connected to the card I/F 103 is the memory card 201 with the wireless communication function, the process proceeds to the process of step S103. Otherwise, the process ends.
(Step S103)
Upon initiation of wireless communication between the digital camera 101 and the PC 301 via the memory card 201 with the wireless communication function, an operator starts up a desired application program (an application program such as releasing a shutter remotely from the PC 301), and inputs a wireless communication start instruction by operating the operation unit 105. The CPU 104 determines whether or not the operation unit 105 has received the input of the wireless communication start instruction. When the CPU 104 determines that the operation unit 105 has received the input of the wireless communication start instruction, the process proceeds to the process of step S104. Otherwise, the process of step S103 is executed again.
(Step S104)
The CPU 104 determines whether or not it is necessary to execute a processing request from the PC 301 within the digital camera 101 in the above-described application program. When the CPU 104 determines that it is necessary to execute the processing request within the digital camera 101, the process proceeds to the process of step S105. Otherwise, the process proceeds to the process of step S106.
(Step S105)
The CPU 104 outputs processing content information indicating content of processing to be executed by the digital camera 101 set for every application program described above to the memory card 201 with the wireless communication function via the card I/F 103. In addition, all processing requests can be output to be executed within the digital camera 101. Thereafter, the process proceeds to the process of step S106.
(Step S106)
The CPU 104 outputs a wireless communication function start-up request message, which is a message for requesting the start-up of the wireless communication function, to the memory card 201 with the wireless communication function via the card I/F 103. Thereafter, the process proceeds to the process of step S107.
(Step S107)
The CPU 104 determines whether or not processing request information, which is information indicating the processing request to be executed within the digital camera 101, has been input from the memory card 201 with the wireless communication function to the card I/F 103. When the CPU 104 determines that the processing request information has been input from the memory card 201 with the wireless communication function to the card I/F 103, the process proceeds to the process of step S108. Otherwise, the process proceeds to the process of S110.
(Step S108)
The CPU 104 executes processing designated by the processing request information input to the card I/F 103 in the process of step S107. Thereafter, the process proceeds to the process of step S109. An example of the processing designated by the processing request information is a release process, which is a process of capturing a still image in the digital camera 101.
(Step S109)
The CPU 104 outputs execution result information, which is information indicating the execution result of step S108, to the memory card 201 with the wireless communication function via the card I/F 103. Thereafter, the process proceeds to the process of step S110. An example of the execution result information is information indicating whether or not an image has been successfully captured when the processing to be executed by the digital camera 101 is the release process in step S108.
(Step S110)
The operator inputs an instruction to end the wireless communication by operating the operation unit 105 when the wireless communication between the digital camera 101 and the PC 301 via the memory card 201 with the wireless communication function ends. The CPU 104 determines whether or not the operation unit 105 has received the input of the wireless communication end instruction. When the operation unit 105 has received the input of the wireless communication end instruction, the process proceeds to the process of step S111. Otherwise, the process returns to the process of step S107.

(Step S111)

The CPU 104 outputs a wireless connection end request message for requesting a wireless communication end to the memory card 201 with the wireless communication function via the card I/F 103. Thereafter, the process ends.

An example of an IO step and a processing content notification step disclosed in the claims corresponds to the process of step S105. In addition, an example of a processing execution step disclosed in the claims corresponds to the process of steps S107 to S109. In addition, in the present invention, for example, the process of steps S105 and S107 to S109 of FIG. 7 are a required component.

Figure 8:
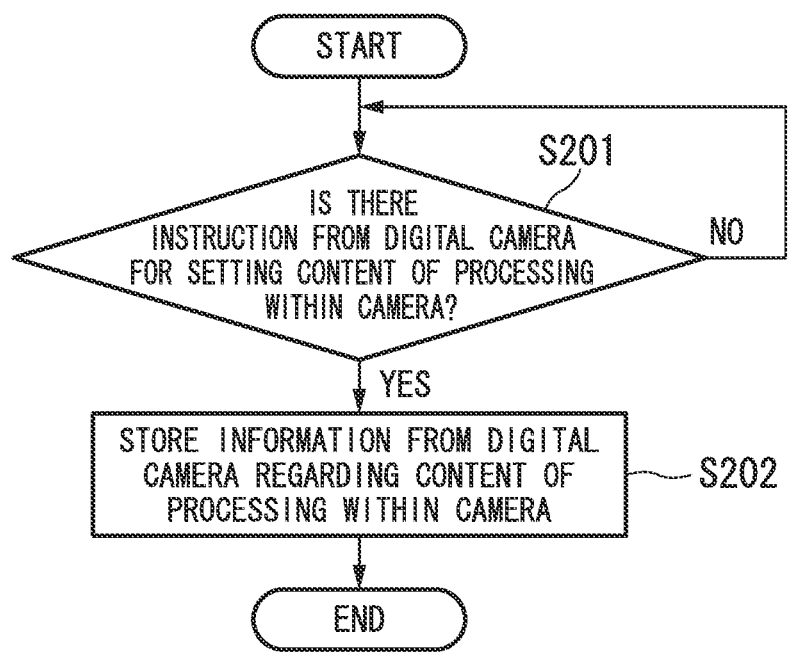
FIG. 8 is a flowchart illustrating a process in which the memory card with the wireless communication function stores processing content information input from the digital camera in a RAM in accordance with the first preferred embodiment of the present invention.

Next, an operation procedure of the memory card 201 with the wireless communication function will be described. FIG. 8 is a flowchart illustrating a process in which the memory card 201 with the wireless communication function stores processing content information input from the digital camera 101 in the RAM 205 in accordance with the first preferred embodiment of the present invention.

(Step S201)

The CPU 202 determines whether or not the processing content information indicating content of processing to be executed by the digital camera 101 has been input from the digital camera 101 to the card I/F 203. When the CPU 202 determines that the processing content information has been input from the digital camera 101 to the card I/F 203, the process proceeds to the process of step S202. Otherwise, the process of step S201 is executed again.

(Step S202)

The CPU 202 causes the RAM 205 to store the processing content information input from the card I/F 203 in the process of step S201. When the input processing content information indicates that all processing requests are executed within the digital camera 101, the indication is stored. Thereafter, the process ends.

Figure 9:
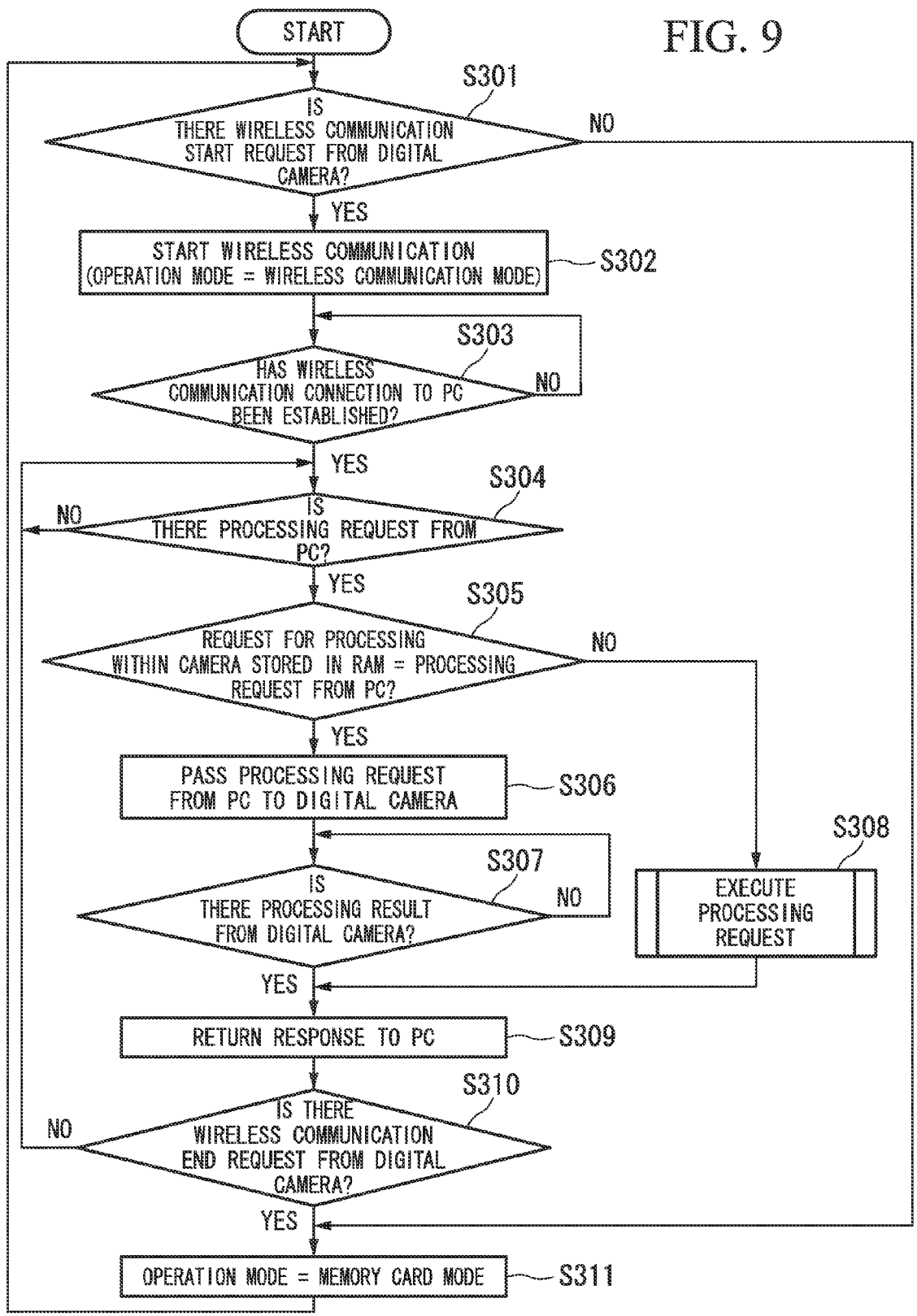
FIG. 9 is a flowchart illustrating an operation procedure of the memory card with the wireless communication function in accordance with the first preferred embodiment of the present invention.

FIG. 9 is a flowchart illustrating an operation procedure of the memory card 201 with the wireless communication function in accordance with the first preferred embodiment of the present invention. The memory card 201 with the wireless communication function executes the process illustrated in the flowchart of FIG. 8 and the process illustrated in the flowchart of FIG. 9 in parallel.

(Step S301)

The CPU 202 determines whether or not a wireless communication start-up request message, which is a message for requesting the start-up of the wireless communication function, has been input from the digital camera 101 to the card I/F 203. When the CPU 202 determines that the wireless communication function start-up request message has been input from the digital camera 101 to the card I/F 203, the process proceeds to the process of step S302. Otherwise, the process proceeds to the process of step S311.

(Step S302)

The CPU 202 controls the wireless communication unit 204, and starts a process of establishing a wireless communication connection to the PC 301. In addition, the CPU 202 sets the operation mode of the memory card 201 with the wireless communication function to a wireless communication mode. Thereafter, the process proceeds to the process of step S303.

(Step S303)

The CPU 202 determines whether or not the wireless communication unit 204 has established the wireless communication connection to the PC 301. When the CPU 202 determines that the wireless communication connection to the PC 301 has been established, the process proceeds to the process of step S304. Otherwise, the process of step S303 is executed again.

(Step S304)

When there is processing desired to be performed by the digital camera 101 or the memory card 201 with the wireless communication function, the PC 301 transmits processing request information indicating a processing execution request to the memory card 201 with the wireless communication function. The CPU 202 determines whether or not the wireless communication unit 204 has received the processing request information from the PC 301. If the CPU 202 determines that the processing request information has been received from the PC 301, the process proceeds to the process of step S305. Otherwise, the process of step S304 is executed again.

(Step S305)

The CPU 202 determines whether or not the RAM 205 has stored the same processing request information as the processing request information received by the wireless communication unit 204 in the process of step S304. When the CPU 202 determines that the RAM 205 has stored the same processing request information as the processing request information received by the wireless communication unit 204, the process proceeds to the process of step S306. Otherwise, the process proceeds to the process of step S308. In addition, when the processing content information indicates that all processing requests are executed within the digital camera 101, the process proceeds to the process of step S306 without determining that the RAM 205 has stored the same processing request information as the processing request information received by the wireless communication unit 204.

(Step S306)

The CPU 202 outputs the processing request information received by the wireless communication unit 204 in the process of step S304 to the digital camera 101 via the card I/F 203. Thereafter, the process proceeds to the process of step S307.

(Step S307)

When the processing request information has been input, the digital camera 101 inputs execution result information indicating the execution result to the card I/F 203 after executing processing designated by the processing request information. The CPU 202 determines whether or not the execution result information has been input to the card I/F 203. When the CPU 202 determines that the execution result information has been input to the card I/F 203, the process proceeds to the process of step S309. Otherwise, the process of step S307 is executed again.

(Step S308)

The CPU 202 executes processing designed by the processing request information received by the wireless communication unit 204 in the process of step S304. Thereafter, the process proceeds to the process of step S309.

(Step S309)

The CPU 202 transmits the execution result information input to the card I/F 203 in the process of step S307 or the execution result information indicating the execution result of the processing designated by the processing request information executed in step S308 to the PC 301 via the wireless communication unit 204. Thereafter, the process proceeds to the process of step S310.

(Step S310)

The CPU 202 determines whether or not a wireless connection end request message, which is a message for requesting a wireless communication end, has been input from the digital camera 101 to the card I/F 203. When the CPU 202 determines that the wireless connection end request message has been input to the card I/F 203, the process proceeds to the process of step S311. Otherwise, the process returns to the process of step S304.
(Step S311)

The CPU 202 controls the wireless communication unit 204, and ends a wireless communication connection to the PC 301. In addition, the CPU 202 sets the operation mode of the memory card 201 with the wireless communication function to a memory card mode, and returns to the process of step S301. When the operation mode is the memory card mode, the memory card 201 with the wireless communication function only operates as the memory card without operating the communication function.

Figure 10:
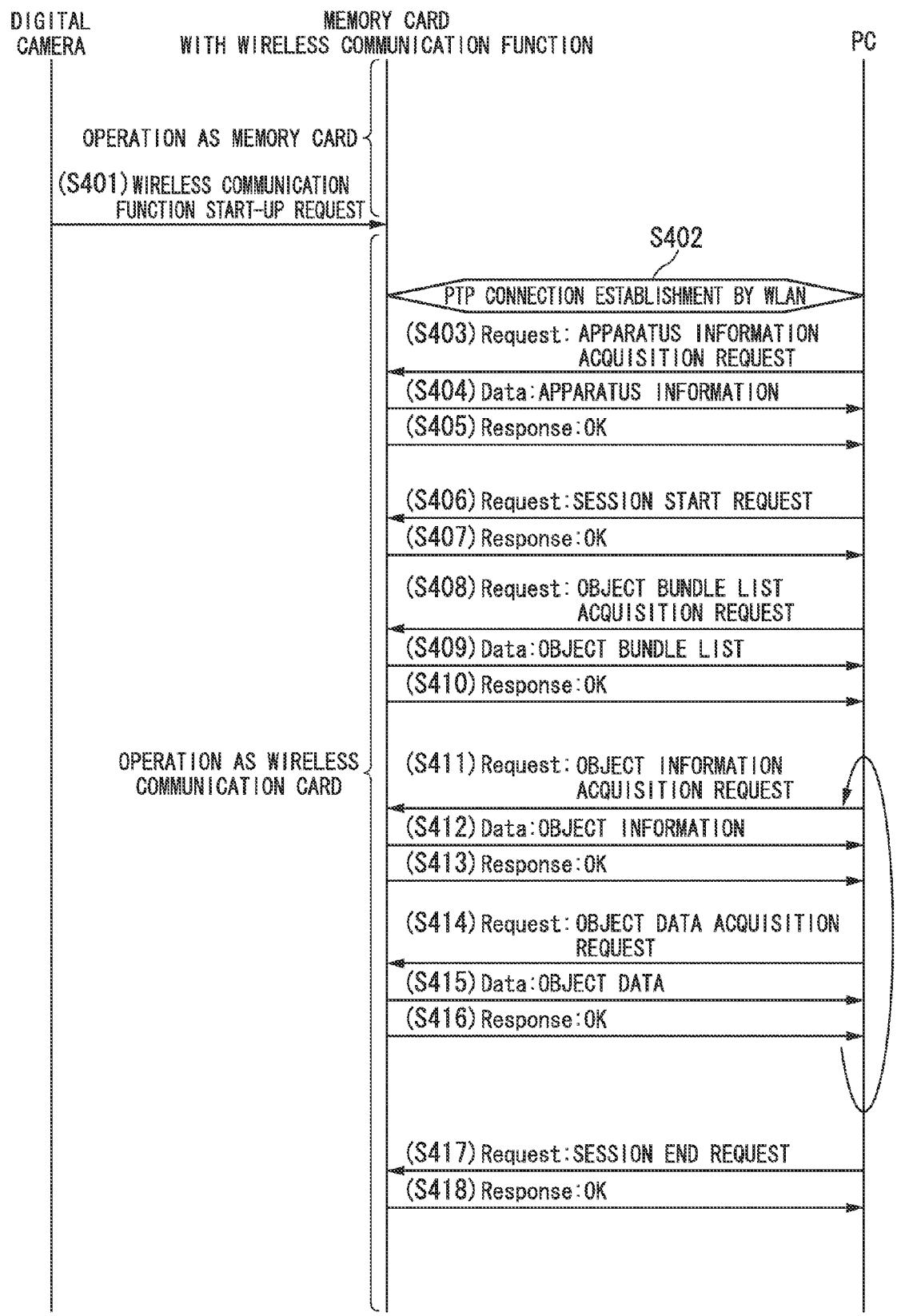
FIG. 10 is a sequence diagram illustrating the communication sequence of the digital camera, the memory card with the wireless communication function, and the PC when processing requested from the PC is executed within the memory card in accordance with the first preferred embodiment of the present invention.

Next, a communication sequence of the digital camera 101, the memory card 201 with the communication function, and the PC 301 will be described with reference to FIGS. 10 to 14. FIG. 10 is a sequence diagram illustrating the communication sequence of the digital camera 101, the memory card 201 with the wireless communication function, and the PC 301 when processing requested from the PC 301 is executed within the memory card 201 with the wireless communication function in accordance with the first preferred embodiment of the present invention.
(Step S401)

The digital camera 101 outputs a wireless communication function start-up request message to the memory card 201 with the wireless communication function.
(Step S402)

The memory card 201 with the wireless communication function establishes a PTP connection by the WLAN to the PC 301.
(Step S403)

The PC 301 transmits a request "apparatus information acquisition request" to the memory card 201 with the wireless communication function.
(Step S404)

The memory card 201 with the wireless communication function transmits data "apparatus information" to the PC 301.
(Step S405)

The memory card 201 with the wireless communication function transmits a response "OK" to the PC 301.
(Step S406)

The PC 301 transmits a request "session start request" to the memory card 201 with the wireless communication function.
(Step S407)

The memory card 201 with the wireless communication function transmits a response "OK" to the PC 301.
(Step S408)

The PC 301 transmits a request "object bundle list acquisition request" to the memory card 201 with the wireless communication function.
(Step S409)

The memory card 201 with the wireless communication function transmits data "object bundle list" to the PC 301.
(Step S410)

The memory card 201 with the wireless communication function transmits a response "OK" to the PC 301.
(Step S411)

The PC 301 transmits a request "object information acquisition request" to the memory card 201 with the wireless communication function.
(Step S412)

The memory card 201 with the wireless communication function transmits data "object information" to the PC 301.
(Step S413)

The memory card 201 with the wireless communication function transmits a response "OK" to the PC 301.
(Step S414)

The PC 301 transmits a request "object data acquisition request" to the memory card 201 with the wireless communication function.
(Step S415)

The memory card 201 with the wireless communication function transmits data "object data" to the PC 301.
(Step S416)

The memory card 201 with the wireless communication function transmits a response "OK" to the PC 301.

Until the transmission/reception of object data is completed, the PC 301 and the memory card 201 with the wireless communication function iterate the process of steps S411 to S416.
(Step S417)

The PC 301 transmits a request "session end request" to the memory card 201 with the wireless communication function.
(Step S418)

The memory card 201 with the wireless communication function transmits a response "OK" to the PC 301.

Figure 11:
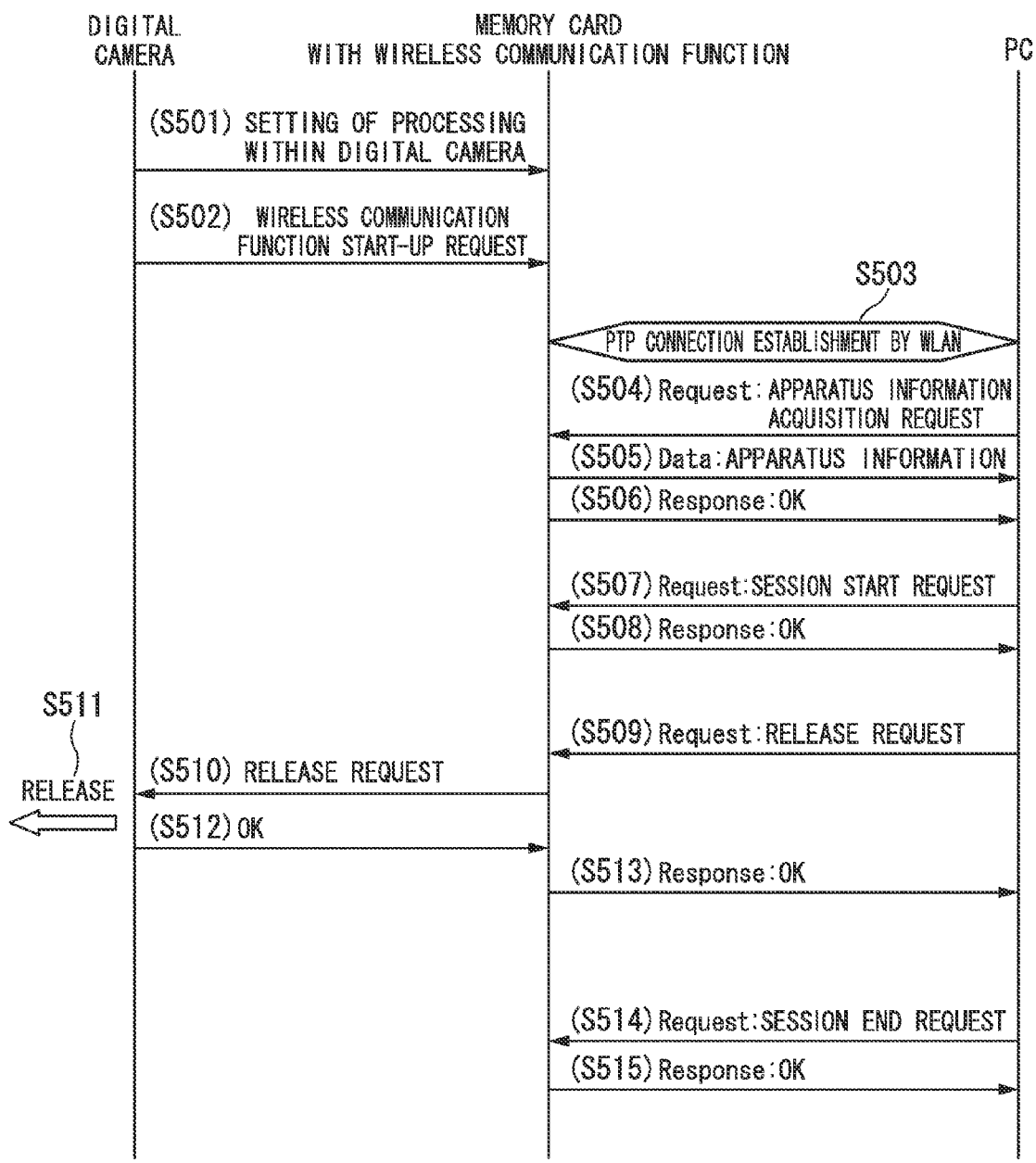
FIG. 11 is a sequence diagram illustrating a communication sequence of the digital camera, the memory card with the wireless communication function, and the PC when a "release process" requested from the PC is executed within the digital camera in accordance with the first preferred embodiment of the present invention.

FIG. 11 is a sequence diagram illustrating a communication sequence of the digital camera 101, the memory card 201 with the wireless communication function, and the PC 301 when a "release process" requested from the PC 301 is executed within the digital camera 101 in accordance with the first preferred embodiment of the present invention.
(Step S501)

The digital camera 101 outputs processing content information "release process" indicating processing to be executed within the digital camera 101 to the memory card 201 with the wireless communication function. The memory card 201 with the wireless communication function stores the processing content information "release process" input from the digital camera 101.

The process of steps S502 to S508 is the same as the process of steps S401 to S407 of FIG. 10.
(Step S509)

The PC 301 transmits a request "release request" (processing request information) to the memory card 201 with the wireless communication function.
(Step S510)

Because the memory card 201 with the wireless communication function stores the processing content information "release process," the processing request information "release request" is output to the digital camera 101.
(Step S511)

The digital camera 101 executes the release process that is a process designated by the processing request information "release request."
(Step S512)

The digital camera 101 outputs processing result information "OK" to the memory card 201 with the wireless communication function.
(Step S513)

The memory card 201 with the wireless communication function transmits a response "OK" (processing result information) to the PC 301.

The process of steps S514 and S515 is the same as the process of steps S417 and S418 of FIG. 10.

Figure 12:
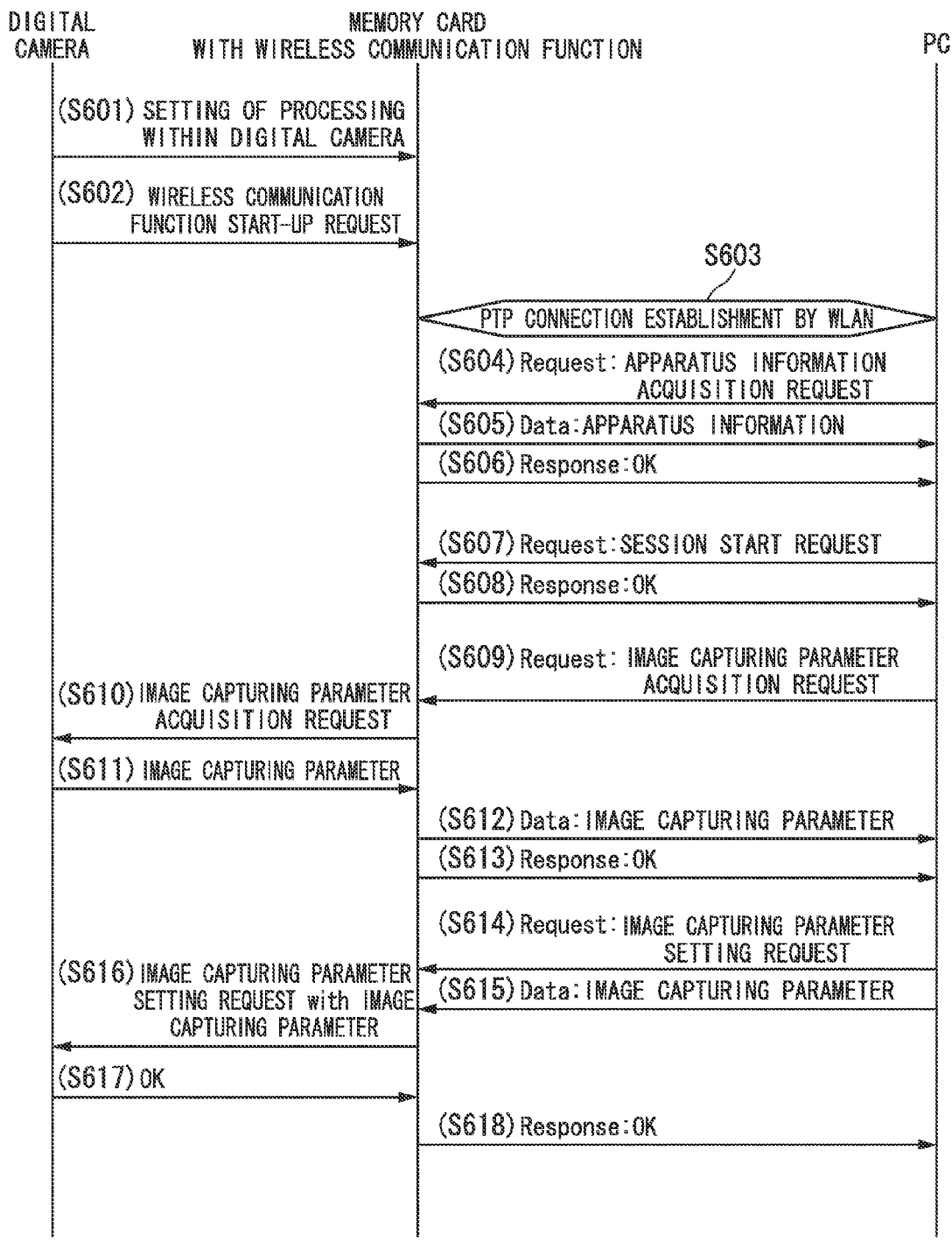
FIG. 12 is a sequence diagram illustrating a communication sequence of the digital camera, the memory card with the wireless communication function, and the PC when an "image capturing parameter acquisition process" or "image capturing parameter change process" requested from the PC is executed within the digital camera in accordance with the first preferred embodiment of the present invention.

FIG. 12 is a sequence diagram illustrating a communication sequence of the digital camera 101, the memory card 201 with the wireless communication function, and the PC 301 when an "image capturing parameter acquisition process" or "image capturing parameter change process" requested from the PC 301 is executed within the digital camera 101 in accordance with the first preferred embodiment of the present invention.

(Step S601)

The digital camera 101 outputs processing content information "image capturing parameter acquisition process" or "image capturing parameter setting process" indicating processing to be executed within the digital camera 101 to the memory card 201 with the wireless communication function. The memory card 201 with the wireless communication function stores the processing content information "image capturing parameter acquisition process" or "image capturing parameter setting process" input from the digital camera 101.

The process of steps S602 to S608 is the same as the process of steps S502 to S508 of FIG. 11.

(Step S609)

The PC 301 transmits a request "image capturing parameter acquisition request" (processing request information) to the memory card 201 with the wireless communication function.

(Step S610)

Because the memory card 201 with the wireless communication function stores the processing request information "image capturing parameter acquisition request," the processing request information "image capturing parameter acquisition request" is output to the digital camera 101.

(Step S611)

The digital camera 101 executes processing designated by the processing request information "image capturing parameter acquisition request," and acquires the image capturing parameter information of the digital camera 101. The digital camera 101 outputs processing result information "image capturing parameter information" to the memory card 201 with the wireless communication function.

(Step S612)

The memory card 201 with the wireless communication function transmits a response "image capturing parameter" (processing result information) to the PC 301.

(Step S613)

The memory card 201 with the wireless communication function transmits a response "OK" to the PC 301.

(Step S614)

The PC 301 transmits a request "image capturing parameter setting request" (processing request information) to the memory card 201 with the wireless communication function.

(Step S615)

The PC 301 transmits data "image capturing parameter" (processing request information) to the memory card 201 with the wireless communication function.

(Step S616)

Because the memory card 201 with the wireless communication function stores the processing request information "image capturing parameter setting request," the processing request information "image capturing parameter setting request" or "image capturing parameter" is output to the digital camera 101.

(Step S617)

The digital camera 101 executes processing designated by the processing request information "image capturing parameter setting request" or "image capturing parameter," and sets the image capturing parameter of the digital camera 101 to a value designated by the "image capturing parameter." The digital camera 101 outputs processing result information "OK" to the memory card 201 with the wireless communication function.

(Step S618)

The memory card 201 with the wireless communication function transmits a response "OK" (processing result information) to the PC 301.

Figure 13:
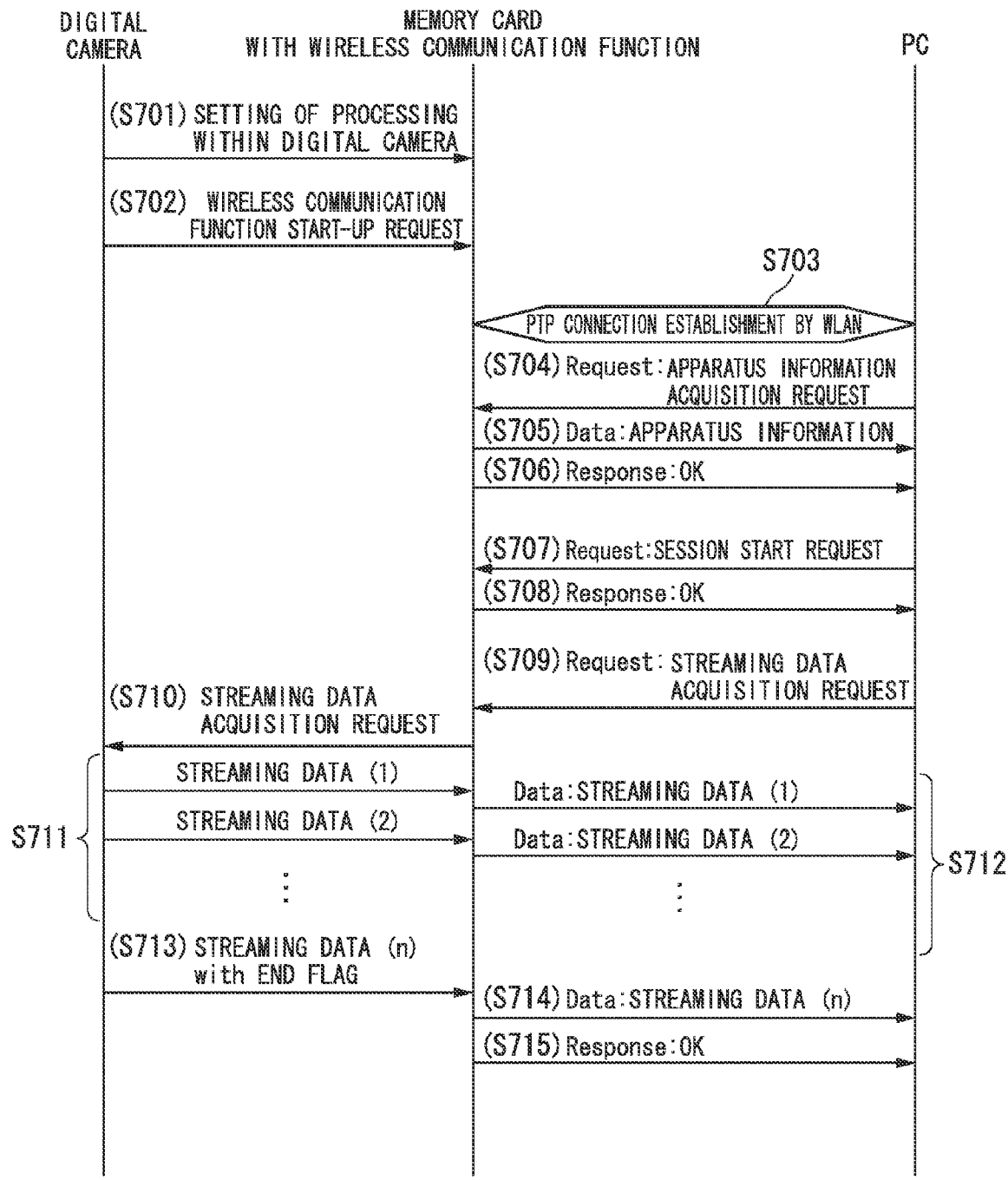
FIG. 13 is a sequence diagram illustrating a communication sequence of the digital camera, the memory card with the communication function, and the PC when a "streaming data transmission process" requested from the PC is executed within the digital camera in accordance with the first preferred embodiment of the present invention.

FIG. 13 is a sequence diagram illustrating a communication sequence of the digital camera 101, the memory card 201 with the communication function, and the PC 301 when a "streaming data transmission process" requested from the PC 301 is executed within the digital camera 101 in accordance with the first preferred embodiment of the present invention.

(Step S701)

The digital camera 101 outputs processing content information "streaming data acquisition request" indicating processing to be executed within the digital camera 101 to the memory card 201 with the wireless communication function. The memory card 201 with the wireless communication function stores the processing content information "streaming data acquisition request" input from the digital camera 101.

The process of steps S702 to S708 is the same as the process of steps S502 to S508 of FIG. 11.

(Step S709)

The PC 301 transmits a request "streaming data acquisition request" (processing request information) to the memory card 201 with the wireless communication function.

(Step S710)

Because the memory card 201 with the wireless communication function stores the processing request information "streaming data acquisition request," the processing request information "streaming data acquisition request" is output to the digital camera 101.

(Step S711)

The digital camera 101 executes processing designated by the processing request information "streaming data acquisition request," and outputs processing result information "streaming data (1)" to "streaming data (n−1)" (n is an integer greater than or equal to 2) to the memory card 201 with the wireless communication function.

(Step S712)

The memory card 201 with the wireless communication function transmits data "streaming data (1)" to "streaming data (n−1)" (processing result information) to the PC 301.

(Step S713)

The digital camera 101 outputs the processing result information "streaming data (n)," which is the last streaming data, and an "end flag" indicating that the processing has ended to the memory card 201 with the wireless communication function.

(Step S714)

The memory card 201 with the wireless communication function transmits data "streaming data (n)" (processing result information) to the PC 301.

(Step S715)

The memory card 201 with the wireless communication function transmits a response "OK" to the PC 301.

Figure 14:
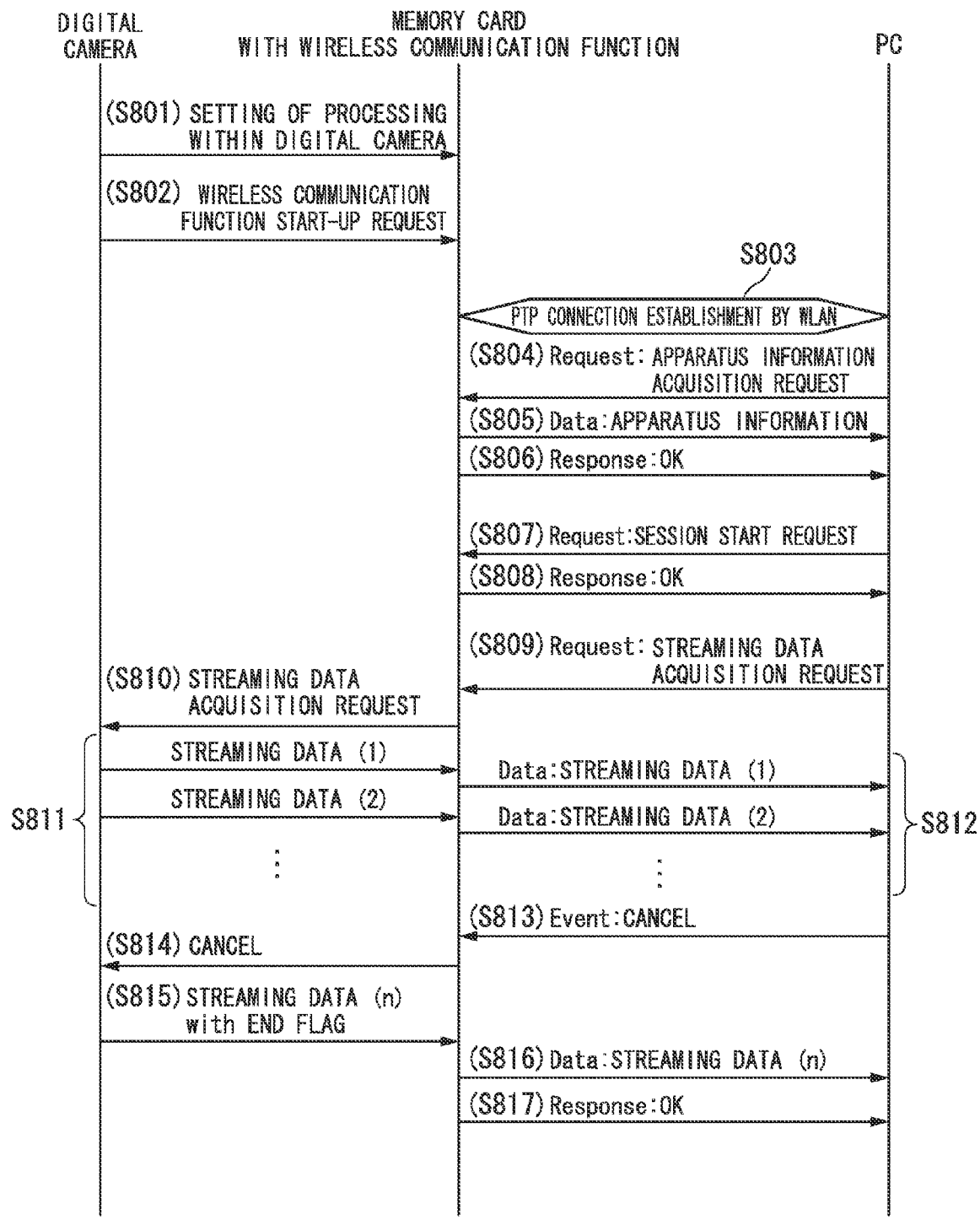
FIG. 14 is a sequence diagram illustrating a communication sequence of the digital camera, the memory card with the wireless communication function, and the PC when a "streaming data transmission process" requested from the PC is executed within the digital camera and the streaming data transmission process is canceled during execution in accordance with the first preferred embodiment of the present invention.

FIG. 14 is a sequence diagram illustrating a communication sequence of the digital camera 101, the memory card 201 with the wireless communication function, and the PC 301 when a "streaming data transmission process" requested from the PC 301 is executed within the digital camera 101 and the streaming data transmission process is canceled during execution in accordance with the first preferred embodiment of the present invention.

The process of steps S801 to S812 is the same as the process of steps S701 to S712 of FIG. 13.

(Step S813)

The PC 301 transmits an event "cancel," which is a processing interrupt instruction, to the memory card 201 with the wireless communication function.

(Step S814)

Because the memory card 201 with the wireless communication function has received the event "cancel," a "cancel message" indicating a processing end instruction is output to the digital camera 101.

(Step S815)

Because the "cancel message" indicating the processing end instruction has been input, the digital camera 101 ends processing designated by the processing request information "streaming data acquisition request" and outputs processing result information "streaming data (n–x)" (x is an integer greater than or equal to 0 and less than n) and an "end flag" indicating a processing end to the memory card 201 with the wireless communication function.

(Step S816)

The memory card 201 with the wireless communication function transmits data "streaming data (n–x)" (processing result information) to the PC 301.

(Step S817)

The memory card 201 with the wireless communication function transmits a response "OK" to the PC 301.

As described above, in accordance with a preferred embodiment of the present invention, the PC 301, which is an external apparatus, transmits processing request information indicating processing to be executed by the memory card 201 with the wireless communication function or the digital camera 101, which is host equipment, to the memory card 201 with the wireless communication function. When it is determined that the memory card 201 with the wireless communication function executes the processing indicated by the received processing request information based on processing content information from the digital camera 101, the memory card 201 with the wireless communication function executes the processing indicated by the processing request information and transmits execution result information indicating the execution result to the PC 301. In addition, when it is determined that the digital camera 101 executes the processing indicated by the received processing request information based on the processing content information input from the digital camera 101, the memory card 201 with the wireless communication function outputs the processing request information to the digital camera 101. When the processing request information has been input from the memory card 201 with the wireless communication function, the digital camera 101 outputs execution result information indicating the execution result to the memory card 201 with the wireless communication function. When the execution result information has been input from the digital camera 101, the memory card 201 with the wireless communication function transmits the input execution result information to the PC 301.

Accordingly, host equipment such as the digital camera 101 without the wireless communication function can also execute processing based on processing request information transmitted from an external apparatus such as the PC 301.

All or some of the above-described functions of the parts provided in the digital camera 101 or all or some of the above-described functions of the parts provided in the memory card 201 with the wireless communication function may be implemented by storing a program for implementing the functions on a non-transitory computer-readable device and causing a computer system to read and execute the program stored on the computer-readable device. The "computer system" used herein may include an operating system (OS) and/or hardware such as peripheral devices.

In addition, "the non-transitory computer-readable device" refers to a flexible disk, a magneto-optical disc, a read only memory (ROM), a portable medium such as a compact disc-ROM (CD-ROM), or a hard disk embedded in the computer system. Further, "the non-transitory computer-readable device" may include a medium for temporarily and dynamically storing programs, like a communication line when a program is transmitted via a network such as the Internet or a communication line such as a telephone line, and a medium for storing programs for a predetermined time, like a volatile memory inside a computer system including a server and a client in that case. The program may be a program for implementing some of the above-described functions. Alternatively, the program may be a program capable of realizing the above-described functions through a combination with a program previously stored in a computer system.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A memory card with a wireless communication function, comprising:

a card interface (I/F) unit configured to input and output data to and from host equipment;

a storage unit configured to store processing content information when the processing content information indicating processing content has been input from the host equipment to the card I/F unit;

a wireless communication unit configured to transmit and receive data by using wireless communication with an external apparatus;

a processing determination unit configured to determine whether or not the storage unit has stored the processing content information corresponding to processing request information when the wireless communication unit has received the processing request information transmitted from the external apparatus;

a processing execution unit configured to execute processing for the processing request information when the processing determination unit determines that the storage unit has not stored the processing content information corresponding to the processing request information, and transmit execution result information indicating an execution result to the external apparatus via the wireless communication unit without outputting the processing request information to the host equipment; and a processing relay unit configured to output the processing request information to the host equipment via the card I/F unit when the processing determination unit determines that the storage unit has stored the processing content information corresponding to the processing request information, and transmit the execution result information to the external apparatus via the wireless communication unit when the execution result information indicating the execution result obtained by executing the processing for the processing request information has been input from the host equipment to the card I/F unit, wherein the processing content information indicates content of the processing to be executed by the host equipment.

2. A method of operating a memory card with a wireless communication function, comprising:
- an input/output (IO) step of inputting and outputting data to and from host equipment;
- a storage step of storing processing content information when the processing content information indicating processing content has been input from the host equipment in the I/O step;
- a wireless communication step of transmitting and receiving data using wireless communication with an external apparatus;
- a processing determination step of determining whether or not the processing content information corresponding to processing request information has been stored in the storage step when the processing request information transmitted from the external apparatus has been received in the wireless communication step;
- a processing execution step of executing processing for the processing request information when it is determined in the processing determination step that the processing content information corresponding to the processing request information has not been stored in the storage step, and transmitting execution result information indicating an execution result to the external apparatus via a wireless communication unit without outputting the processing request information to the host equipment; and
- a processing relay step of outputting the processing request information to the host equipment via the card I/F unit when it is determined, in the processing determination step, that the processing content information corresponding to the processing request information has been stored in the storage step, and transmitting the execution result information to the external apparatus when the execution result information indicating the execution result obtained by executing the processing for the processing request information has been input from the host equipment, wherein
the processing content information indicates content of the processing to be executed by the host equipment.

3. A non-transitory computer-readable device storing a computer program for causing a computer to execute:
- an IO step of inputting and outputting data to and from host equipment;
- a storage step of storing processing content information when the processing content information indicating processing content has been input from the host equipment in the IO step;
- a wireless communication step of transmitting and receiving data using wireless communication with an external apparatus;
- a processing determination step of determining whether or not the processing content information corresponding to processing request information has been stored in the storage step when the processing request information transmitted from the external apparatus has been received in the wireless communication step;
- a processing execution step of executing processing for the processing request information when it is determined, in the processing determination step, that the processing content information corresponding to the processing request information has not been stored in the storage step, and transmitting execution result information indicating an execution result to the external apparatus via a wireless communication unit without outputting the processing request information to the host equipment; and
- a processing relay step of outputting the processing request information to the host equipment via the card I/F unit when it is determined in the processing determination step that the processing content information corresponding to the processing request information has been stored in the storage step, and transmitting the execution result information to the external apparatus when the execution result information indicating the execution result obtained by executing the processing for the processing request information has been input from the host equipment, wherein
the processing content information indicates content of the processing to be executed by the host equipment.

* * * * *